United States Patent
Hjalmarsson et al.

(10) Patent No.: US 9,095,147 B2
(45) Date of Patent: Aug. 4, 2015

(54) FOOD PROCESSING APPARATUS FOR DETECTING AND CUTTING TOUGH TISSUES FROM FOOD ITEMS

(75) Inventors: Helgi Hjalmarsson, Kopavogur (IS); Einar Bjorn Jonsson, Reykjavik (IS)

(73) Assignee: VALKA EHF, Kopavogur (IS)

( * ) Notice: Subject to any disclaimer, the term of this patent is extended or adjusted under 35 U.S.C. 154(b) by 379 days.

(21) Appl. No.: 13/577,316

(22) PCT Filed: Feb. 4, 2011

(86) PCT No.: PCT/IS2011/000001
§ 371 (c)(1),
(2), (4) Date: Aug. 6, 2012

(87) PCT Pub. No.: WO2011/095998
PCT Pub. Date: Aug. 11, 2011

(65) Prior Publication Data
US 2012/0307013 A1     Dec. 6, 2012

(30) Foreign Application Priority Data
Feb. 5, 2010   (EP) .................................... 10001250

(51) Int. Cl.
*A22C 17/00*    (2006.01)
*A22C 21/00*    (2006.01)
*A22C 25/16*    (2006.01)

(52) U.S. Cl.
CPC ......... *A22C 17/0086* (2013.01); *A22C 21/0069* (2013.01); *A22C 25/166* (2013.01)

(58) Field of Classification Search
USPC ......................................................... 348/46
See application file for complete search history.

(56) References Cited

U.S. PATENT DOCUMENTS

| | | | |
|---|---|---|---|
| 3,872,695 A | * | 3/1975 | Busek .............................. 69/47 |
| 4,557,019 A | | 12/1985 | Van Devanter et al. |
| 4,748,724 A | | 6/1988 | Lapeyre et al. |
| 4,962,568 A | | 10/1990 | Rudy et al. |
| 4,970,757 A | | 11/1990 | Heiland et al. |

(Continued)

FOREIGN PATENT DOCUMENTS

| DE | 69104122 | 3/1995 |
|---|---|---|
| JP | 9224935 | 9/1997 |

(Continued)

OTHER PUBLICATIONS

International Search Report for PCT/IS2011/000001, Completed by the European Patent Office on Jun. 27, 2011, 2 Pages.

*Primary Examiner* — Michael Teitelbaum
(74) *Attorney, Agent, or Firm* — Brooks Kushman P.C.

(57) ABSTRACT

A food processing apparatus for detecting and cutting tough tissues from food items such as fish, meat, or poultry. At least one x-ray machine associated to a first conveyor for imaging incoming food items on the first conveyor based on a generated x-ray image indicating the location of the tough tissues in the food items. A vision system supplies second image data of the food items subsequent to the imaging by the x-ray machine. The second image data including position related data indicating the position of the food items on the second conveyor prior to the cutting. A mapping mechanism determines an estimated coordinate position of the food items on the second conveyor by utilizing the x-ray image and tracking position data. The processor compares the estimated coordinate position of the food items to the actual position on the second conveyor based on the second image data.

14 Claims, 11 Drawing Sheets

(56) References Cited

U.S. PATENT DOCUMENTS

| | | | |
|---|---|---|---|
| 5,162,016 A * | 11/1992 | Malloy | 452/149 |
| 5,205,779 A | 4/1993 | O'Brien et al. | |
| 7,452,266 B2 | 11/2008 | Bottemiller | |
| 7,715,935 B2 | 5/2010 | Vogeley, Jr. et al. | |
| 2002/0071038 A1* | 6/2002 | Mihelcic | 348/207 |
| 2005/0085176 A1* | 4/2005 | Houtz | 452/157 |
| 2005/0147325 A1* | 7/2005 | Chen et al. | 382/294 |
| 2006/0161380 A1 | 7/2006 | Bottemiller | |
| 2009/0170417 A1* | 7/2009 | Janssen et al. | 452/136 |

FOREIGN PATENT DOCUMENTS

| | | |
|---|---|---|
| WO | 8908983 | 10/1989 |
| WO | 0243502 | 6/2002 |
| WO | 2006064521 | 6/2006 |
| WO | 2006092311 | 9/2006 |
| WO | 2007022782 | 3/2007 |

* cited by examiner (a)

(b)

FOOD PROCESSING APPARATUS FOR DETECTING AND CUTTING TOUGH TISSUES FROM FOOD ITEMS

CROSS-REFERENCE TO RELATED APPLICATION

This application is the U.S. national phase of PCT Appln. No. PCT/IS2011/000001 filed on Feb. 4, 2011, which claims priority to EP Patent Application No. 10001250.9-1260 filed on Feb. 5, 2012, the disclosures of which are incorporated in their entirety by reference herein.

FIELD OF THE INVENTION

The present invention relates to a food processing apparatus and a method for detecting and cutting tough tissues such as bones, cartilage, and fat from food item pieces.

BACKGROUND OF THE INVENTION

Many companies have tried in the last decades to remove bones automatically out of food products. The most common attempts have been made to take pin bones out of white fish and salmon fillets. For salmon fillets several companies have been successful in picking out bones from fillets which have been allowed to mature for about 2-4 days after the salmon was slaughtered. Carnitech and Uni-food in Denmark are two of the companies which make such machines. Recently several salmon companies have started to produce a salmon product which is called pre-rigor loins from salmon fillets. The production of those loins require that the pin bones are taken out of the fillets while they are still in rigor. Current methods or machines does not work in this case as the bones are then stuck a lot tighter than in matured fillets.

A similar machine as is used to pick out bones from salmon fillets has been developed by the company Marel and used on white fish fillets including cod, haddock and saithe. The same problems is with this machine as with the pin bone removing machine for salmon that it does not work well on very fresh fish.

More recently the Icelandic company Skaginn attempted to cut pin bones automatically from super chilled fillets with water jet cutting as is described in patent application WO 2006/064521 A1. First of all it is not practical in all cases to super chill the fillets prior to cutting due to extensive cost and space requirement as well as many processor believe it reduces the quality of the products to bring the food to freezing as it changes the properties of the food. Furthermore the super cooling does only generate benefit for a limited number of cases. Skaginn used a regular camera to take a picture of the fillet and estimate based on the image where the bones are. With this method it is not possible to cut out bones from fish fillets with the accuracy and reliability which is required by the industry.

The usage of water jet cutting and a vision system is also disclosed in application U.S. Pat. No. 4,557,019 and then later with minor additions in patent U.S. Pat. No. 4,962,568. In those patents there is however no attempt made to cut food items into sections where selected sections are bone free as other include bones.

The company Trio Food Processing Machinery in co-operation with a Norwegian research agency, SINTEF, tried to cut pin bones automatically from pre-rigour salmon fillets. The idea was to use regular computer vision and then cut the soft root of the pin bones as the force needed to extract the bones is supposedly reduced by that by about 50%. The cut is performed by inserting a long thin knife from the head end of the fillet close to the skin. The knife is inserted in such a way that the tip of the knife follows a trajectory where the tendons are estimated to be located, and thus cuts the tendons. The pin bones can not be seen directly on the outside of the fillet. It was thus necessary to estimate the location of the tendon attachment based on features on surface of the fillet. One alternative in this method could be to detect the bone ends and use those to position the cut. The bone ends are however also often well hidden into the flesh, which makes any detection of them difficult and unreliable. This method has not been successful so far.

U.S. Pat. No. 5,162,016 discloses a method for segmenting an animal carcass by placing it on a mounting vehicle, which forms a portion of a carcass transport system. The mounting vehicle securely holds the carcass and transports it to an imaging station in which a position of a selected bone in the carcass is determined using a first and a second scanner. The first scanner includes two television cameras and the second scanner includes two X-ray tubes.

Before imaging begins, the mounting vehicle or the carcass thereon is positioned in a known location within the imaging station. For instance, a detector, such as photodiode, is positioned within the imaging station to deliver a control signal in response to the carcass or the mounting vehicle reaching a predetermined location. The control signal causes the drive mechanism driving the mounting vehicle to stop the mounting vehicle in the predetermined location. Once in position, the interior and exterior portions of the carcass is scanned.

After the scanning, the mounting vehicle transports the carcass to a cutting station, where pressurized fluid stream containing an abrasive material is directed toward the carcass along a cutting path created by the information from the scanners. At the cutting station, a detector is provided that determines the proper position of the carcass so that the pressurized fluid stream can segment the carcass along the predetermined cutting paths into e.g. primary cuts, such as shank, the round, the rump, the sirloin, the loin, the flank, the rib, the chuck, the plate etc. These primary cuts fall onto a conveyor belt that operates below the carcass.

Based on the above, U.S. Pat. No. 5,162,016 is limited to cutting cattle, pigs and labs carcasses, but not the resulting primary cuts such as the shank, the round, the rump, the sirloin etc., which are subsequently delivered for further butchering or transport to a wholesale outlet.

The inventor of the present invention has appreciated that there is thus a need for food processing apparatus that is capable of automatically processing food item pieces such as said primary cuts resulting from U.S. Pat. No. 5,162,016, but also all kinds of food item pieces such as fish fillets, poultry pieces and the like with the aim of increasing the cutting yield and has in consequence devised the present invention.

SUMMARY OF THE INVENTION

It would be advantageous to achieve a food processing apparatus that makes it possible to detect and remove tough tissues from foot item pieces such as fish fillets and thus increase the cutting yield. In general, the invention preferably seeks to mitigate, alleviate or eliminate one or more of the above mentioned disadvantages singly or in any combination. In particular, it may be seen as an object of the present invention to provide a food processing apparatus that solved the above mentioned problems, or other problems, of the prior art.

To better address one or more of these concerns, in a first aspect of the invention a food processing apparatus is provided adapted for detecting and cutting tough tissues such as bones, cartilage, and fat from food item pieces such as fish or meat fillets or poultry items, comprising:

a first conveyor having an in-feed end and an out-feet end, at least one x-ray machine associated to said first conveyor for imaging incoming food items conveyed on the first conveyor and based on the imaging generating x-ray image data indicating the location of the tough tissues in said food item pieces, a second conveyor which in-feed end is adapted to be placed adjacent to the out-feed end of said first conveyor for receiving said food items pieces from the out-feed end of the first conveyor, a vision system for supplying second image data of said food item pieces subsequent to the imaging by said at least one x-ray machine, the second image data including position related data indicating the position of the food item pieces on said second conveyor prior to said cutting, said second conveyor being adapted to convey the food item pieces during said imaging and while cutting said tough tissues from said food item pieces, and a tracking mechanism for tracking the position of the food item pieces at all times, characterized by a mapping mechanism comprising:

a processor for utilizing the tracking position data for the food items subsequent to said x-ray imaging data so as to determine an estimated position of the food item pieces on said second conveyor, where subsequent to obtaining the second image data, comparing said estimated coordinate position of the food item pieces to the actual position on the second conveyor based said second image data, where in case of non-match between said estimated coordinate position and said actual position, a processor for mapping the x-ray image data onto the second image data such that the position of the tough tissues matches to said second image data, and a control unit operable to operate a cutting means for cutting said food items pieces by utilizing said mapped x-ray image data as operation data.

Accordingly, although the precise location of the fillet was captured when the x-ray image was taken and an accurate encoder is used to track the movement of the fillet, there will always be some uncertainty about the fillet location when it is transferred from the "x-ray conveyor" over to the "cutting conveyor" where the cutting takes place. For example when an x-ray system is used as tough tissue detection means a very thin solid belt conveyor may be most suitable as a first conveyor. If the cutting means is high pressure water jet the most suitable second conveyor may be a strong porous steel belt conveyor or any type of a cutting belt conveyor, and thus it will be necessary to take an image of the items on the cutting belt so as to provide an accurate location image of the food items on the cutting belt conveyor.

Thus, by providing such a correction by mapping the detected location of e.g. bones in fish fillets over to the second image data, the bones become transferred over to the coordinate system of the vision camera image (the second image data) so that the x-ray data match the second image data. Thus, if e.g. the transfer from said first conveyor ("x-ray conveyor") to the second conveyor ("cutting conveyor") causes the fish fillet to move 1 mm to the side so that the x-ray image data and the second image data do not match, it will be ensured that this will be corrected, i.e. the x-ray data will be "moved" 1 mm back so that they match with the second image data. Based on the above, a food processing apparatus is provided that is capable of cutting said tough tissues, e.g.

remove bones from fish fillets, fully automatically with high accuracy. Also, the fact that the conveyed food item pieces are at no time stopped during said processing, i.e. imaging and cutting, means that the processing speed becomes very high and therefore the productivity of the food processing apparatus. Thus, a complete food processing apparatus is provided that can cut food items into portions with higher accuracy than previously possible. The benefit of increased accuracy is that the apparatus is capable of minimizing the size of the tough tissues portions such as bones by cutting as close to the bones as possible. In the following we will refer to increasing the cutting yield as the apparatus can cut closer to the tough tissues and can thus minimize the size of the items containing tough tissues. It should be noted however that for practical production reasons it might be feasible to keep some of the portions hanging together and thus not cut entirely between the portions during the cutting process. The food items can as an example be selected from fish fillet, or meat or poultry meat such as chicken breast and the tough tissues can be bones, or cartilage, fat stripes from the fillet and the like. In the following, it will be assumed that the tough tissues are bones.

It should be noted that the term "cutting said food items pieces" may include, but is not limited to, cutting and removing the tough tissues (e.g. bones, cartilage, or fat) from the food item pieces, or cutting the food item pieces such that they hang together, where the cutting is based on said mapped x-ray image data. Therefore, one piece can e.g. be the piece the contains the bone part, while the remaining part include the bone free parts.

In one embodiment, comparing by said processor the estimated position of the food item pieces on said second conveyor to the actual position on the second conveyor based on said second image data comprises:

comparing whether the center of gravity for the x-ray imaging data matches with the center of gravity of the second image data, where in case on non-match, mapping the x-ray imaging data onto the second image data such that the center of gravity of the x-ray imaging data matches with the center of gravity of the second image data, or comparing whether the principle axis for the x-ray imaging data matches with the principle axis of the second image data, where in case on non-match, mapping the x-ray imaging data by means of rotating the x-ray imaging data until the principle axis for the x-ray image and the second image data are coincident, or comparing whether the scaling of the x-ray imaging data matches with the scaling of the second image data by means of comparing the area of the x-ray imaging data matches with the second image data, where in case of non-match, mapping the x-ray imaging data by means of adjusting the scaling of the x-ray imaging data until the area of x-ray imaging data matches with the area of the second image data, a combination of one or more of the above.

In one embodiment, the x-ray machine comprises two or more x-ray sources placed at different viewing angles with respect to the incoming food objects adapted to emit x-ray beams onto the incoming food objects under said different viewing angles and thus generate at least two x-ray measuring data, the food processing apparatus further comprising a processor for generating said first image data by processing the at least two x-ray measuring data for generating three dimensional (3D) x-ray image data of said tough tissues In one embodiment, said vision system is selected from:

a digital camera, said second image data including being a 2D silhouette image data of said food items, a digital camera and a laser based vision, said image data being full 3D image data of said food items, and a colour digital camera and a laser based vision system, said image data being full colour 3D image data of said food items.

In one embodiment, said the dimensional (3D) image data obtained from said digital camera and a laser based vision are used for estimating:
the volume of the food items,
the weight of the food items,
the thickness profile of the food items,
the colour or the colour profile of the food items so as to estimating or detecting fat or defects such as blood spots or gaping, on the food items,
any combination thereof.

In one embodiment, said vision system is a three dimensional vision (3D) system adapted to capture 3D image of said food item pieces in addition to said 3D x-ray image data, the comparing by said processor the estimated position of the food item pieces on said second conveyor to the actual position on the second conveyor based on said second image data comprising determining whether the total volume of the 3D x-ray image data matches with the volume of the 3D image data, where in case of non-match, mapping by said processor the volume of the 3D x-ray image data onto the volume of the 3D image data such that the volumetric error is minimized.

In one embodiment, said volumetric error is minimized by means of minimizing of the volumetric error being determined by said processor by means of minimizing the sum $X+Y$ of the two volumes minus the common set $X \cap Y$ of the two volumes, where X is the volume determined by said two or more x-ray sources and Y being the volume determined by said 3D vision system.

In one embodiment, the comparing by said processor the estimated position of the food item pieces on said second conveyor to the actual position on the second conveyor based on said second image data comprising comparing whether the cross sectional surfaces of said 3D x-ray image data matches with the cross sectional surfaces of said 3D image data, where in case of non-match, mapping the said 3D x-ray image data onto the 3D image data such that the difference between the area of the cross sectional surfaces between the 3D x-ray image data and the 3D image data is minimized.

In one embodiment, cutting means is a high pressure water jet nozzle system or a cutting blade having one to six degrees of freedom movement.

In one embodiment, said three dimensional x-ray image data are processed for determining an angle of the tough tissues in the food items, the angle of the tough tissues being used for determining a cutting angle which is used as a tuning parameter for adjusting the angle of the high pressure water jet nozzle system or the cutting blade when cutting the tough tissues from the food items.

In one embodiment, the food processing apparatus further comprises a second tough tissue detection means for generating third image data by imaging the processed food items after removing the cut portions there from.

In one embodiment, the second tough tissue detection means is an x-ray machine and where the third image data is x-ray image data.

In one embodiment, the third image data is x-ray image data which is processed by said control unit and used as a tuning parameter for tuning the operation of the cutting means.

In one embodiment, the second tough tissue detection means is an x-ray machine or a vision system and where the third image data is the resulting image data from the x-ray machine or a vision system, the third image subsequently being processed by said control unit and used as a tuning parameter for tuning the operation of the cutting means.

Accordingly, the quality of the cutting can be monitored and eventually it is possible to make the necessary adjustments of the cutting device and in that way make a kind of feed-back correction for the cutting procedure.

In one embodiment, the food items are selected from fish fillet where the tough tissues are the bones in the fish filet, meat where the tough tissues is cartilage, bones or fat or combination thereof, poultry meat where the tough tissues is cartilage, bone or fat or combination thereof.

In one embodiment, the x-ray machine comprises two or more x-ray sources placed at different viewing angles with respect to the incoming food objects adapted to emit x-ray beams onto the incoming food objects under said different viewing angles and thus generate at least two x-ray measuring data, the food processing apparatus further comprising a processor for generating said first image data by processing the at least two x-ray measuring data for generating three dimensional x-ray image data of said tough tissues. The image data can thus be implemented to determine a cutting angle which will result in maximizing the cutting yield because such a 3D image allows determining the angle of the bones/cartilage or even better a precise location of the bones/cartilage in a full three dimensional image of the food item. For cheaper products where the cutting yield is not so important and a straight cut is sufficient a priory knowledge about the angle may be used. For expensive products where the cutting yield is really important the maximum cutting yield is sought and a more complex bone detection system will be used where an image of the food item will be taken with multiple cameras.

In a second aspect of the invention a method is provided for detecting and cutting tough tissues such as bones, cartilage, and fat from food item pieces such as fish or meat fillets or poultry items, comprising:

imaging incoming food item pieces using at least one x-ray machine while conveying the food item pieces on a first conveyor and based on the imaging generating x-ray image data indicating the location of the tough tissues in said food item pieces, conveying, subsequent to said x-ray imaging, said food item pieces on a second conveyor (6), where during the conveying, supplying second image data of said food item pieces (101) subsequent to the imaging by said at least one x-ray machine, cutting said tough tissues from said food item pieces subsequent to supplying the second image date, the second image data including position related data indicating the position of the food item pieces on said second conveyor (6), and tracking the position of the food item pieces at all times, characterized by the steps of:

utilizing the tracking position data for the food items subsequent to said x-ray imaging data so as to determine an estimated position of the food item pieces on said second conveyor (6), where subsequent to obtaining the second image data, comparing said estimated coordinate position of the food item pieces to the actual position on the second conveyor based said second image data, where in case of non-match between said estimated coordinate position and said actual position, mapping the x-ray image data onto the second image data such that the position of the tough tissues matches to said second image data, and cutting said food items pieces by utilizing said mapped x-ray image data as operation data.

In a third aspect, a computer program is provided comprising instructions for carrying out all the steps of said method when said computer program is executed on a computer system.

Said food processing apparatus for detecting and cutting tough tissues from food items may in its most simplified embodiment comprise:

a tough tissue detection means for imaging incoming food items and based on the imaging generating first image data indicating the location of the tough tissues in said food items, and a control unit operable to operate a cutting means based on the first image data so as to cut portions of said incoming food items containing the tough tissues.

Said method of detecting and cutting tough tissues from food items may in its most simplified embodiment comprise:

imaging incoming food items and based on the imaging generating first image data indicating the location of the tough tissues in said food items, and operating a cutting means based on the first image data so as to cut portions of said incoming food items containing the tough tissues.

In general the various aspects of the invention may be combined and coupled in any way possible within the scope of the invention. These and other aspects, features and/or advantages of the invention will be apparent from and elucidated with reference to the embodiments described hereinafter.

BRIEF DESCRIPTION OF THE DRAWINGS

Embodiments of the invention will be described, by way of example only, with reference to the drawings, in which.

DESCRIPTION OF EMBODIMENTS

Figure 1:
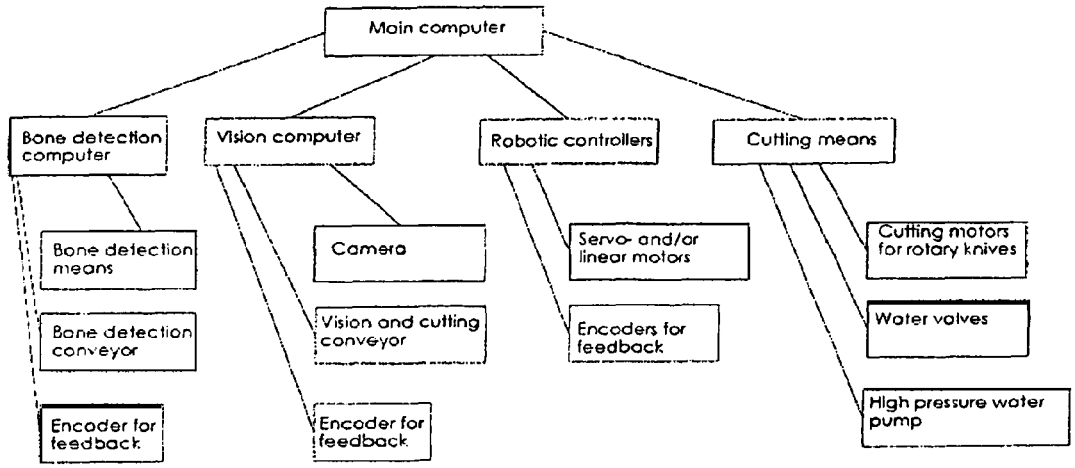
FIG. 1 shows a conceptual setup of food processing apparatus according to the present invention.

In general, this invention is related to automatic cutting of food products where the food items would typically tough tissues such as bones, fat or cartilage inside them and part of the objective of the cutting process is to cut out the tough tissues. For simplicity, in the following it will be assumed that the tough tissues are bones, but the tough tissues may just as well be cartilage and the like.

Typically consumers prefer to get their food without bones and bone free products will therefore commonly sell for a higher price than products with bones inside. It is therefore usually desirable to cut the food products in such a way that the section which includes the bones is kept to an absolute minimum size. This means that the cutting process must have an ability to cut the food products as close to the bones as possible.

As cutting processes are commonly not 100% accurate it can happen that bones can remain in sections of the food items which were supposed to be bone free and it can thus be very beneficial to be able to automatically detect if there are bones remaining in those items.

Although it is possible to cut the food items when they are stationary it is more practical for production purposes to cut the items on a moving conveyor. Generally, there are two possible methods of cutting the food items, one is to use water jet cutting nozzles attached to e.g. some sort of robotic arm with one to six degrees of freedom, where more nozzles and robotic arms may be used if a single nozzle cannot make all the cut needed at the speed the cutting conveyor is moving at. Another alternative is to use mechanical knives of various types, such as rotating blade knife. When mechanical knives are used it is necessary to hold the items steady and that is done with a vacuum suction system underneath the cutting belt. In either case the cutting belt will preferably be porous in the water cutting application to minimize the damage the water jet does to the belt during cutting and in the other case to ensure that the vacuum can reach to the food item from underneath the belt.

In some cases it is possible to use the same belt for the bone detection system as will be used for cutting. This will make tracking of the food items a lot easier for cutting and in those cases another vision systems might not be needed. For most application however this is not the case. For example when an x-ray system or super sonic imaging system as disclosed in JP 9224935, hereby incorporated in whole by reference, may be used for bone detection and water jet cutting is used. A very thin solid belt is most suitable for the x-ray machine while a strong porous steel belt is most suitable as the cutting belt. As will be discussed in more details here below, another vision system may be used to take an image of food the items on the cutting belt. This vision system can be a simple camera generating a 2D silhouette image of the items or an advanced colour camera and a laser vision capable of creating a full colour 3D image of the object. One of the primary objective of the second vision system is to locate the food item as accurately as possible and to map the detected locations on the bones from the bone detecting system as accurately as possible. Other objectives are to gather various information about the food items which will be used for further guiding of the cut. This information includes the volume of the item which can be used to estimate the weight such that the item can be cut into portions of predefined weight. Another information from a colour image of the item is to detect fat on a food item and the cutting pattern can thus involve cutting that part of the item into a separate portion.

After cutting it can be beneficial to be able to remove the pieces which contain bone while the remaining portions are conveyed to another bone detection system. This system will then detect portions which still have bones although they were supposed to be bone free after cutting. Those portions would then typically be directed to a trimming table where a person would cut out the remaining bones. Food processors can commonly get higher price for a food product when it can be guaranteed that the portions are free from bones.

Portions which contain bones could also purposely be put through the second bone detection system. By identifying how much tissue is remaining on these pieces around the bones valuable feed back can be given to the control computer. That feed back can then be used to optimize the cutting even further.

When cutting fish fillets it can be desirable to leave the skin on the fillets during the cutting process for mainly one or more of three reasons. One is that skinning can sometimes alter the location of the bones and thus reduce the yield during cutting. The second reason is that fish portions with skin on can better tolerate handling and can thus ensure in some cases higher quality end product and finally some customers prefer fillet portions with skin on and those part of the fillets can then be left with the skin on while other portions can be skinned. The process described here above is identical for fish portions with or without skin although it is possible to detect the skin on the fillets and the cutting pattern can be dependent upon presence of skin on the items.

FIG. 1 shows an embodiment of a conceptual setup of an apparatus according to the present invention for detecting and cutting tough tissues from food item pieces, showing a main computer which operates a bone detection computer, a vision computer, a robotic controller and a cutting means, respectively. The bone computer operates a bone detection means, a bone detection conveyor, and an encoder feedback. The vision computer operates a camera, a vision and cutting conveyor and an encoder for feedback. The Robotic controllers operates servo- and/or linear motors and encoders for feedback. The cutting means operates cutting motors for rotary knives, water valves and high pressure water pump.

Figure 2:
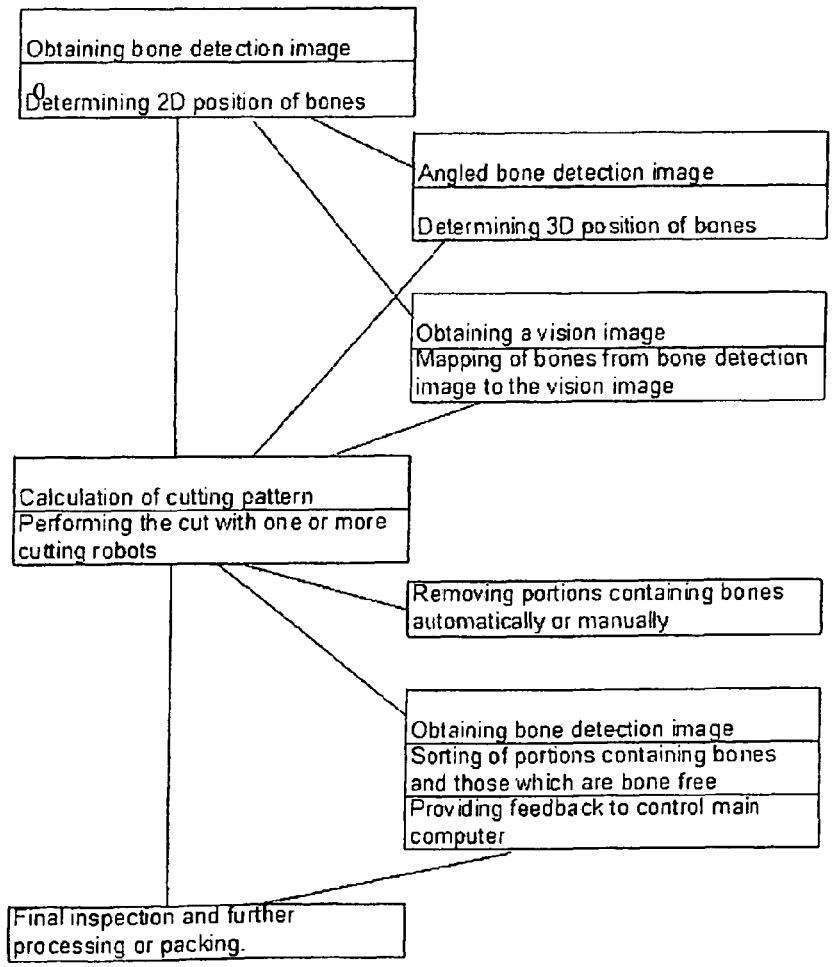
FIG. 2 shows a flow diagram of a method according to the present invention of detecting and cutting tough tissues from food items.

FIG. 2 shows illustrates an embodiment of a flow diagram of a method according to the present invention for detecting and cutting tough tissues from food items.

Figure 3:
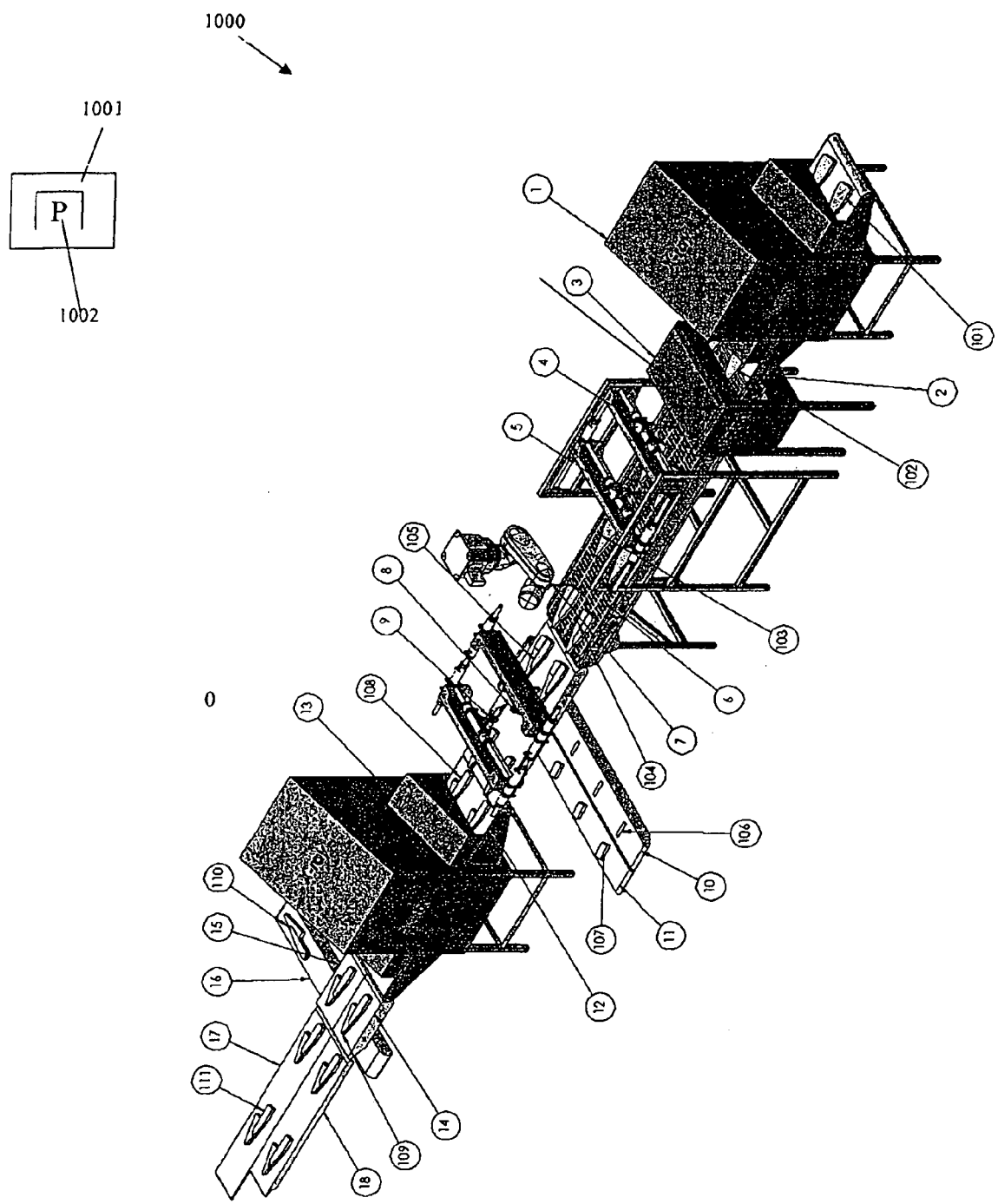
FIG. 3 shows a food processing apparatus according to the present invention for detecting and cutting tough tissues from food items.
Figure 4:
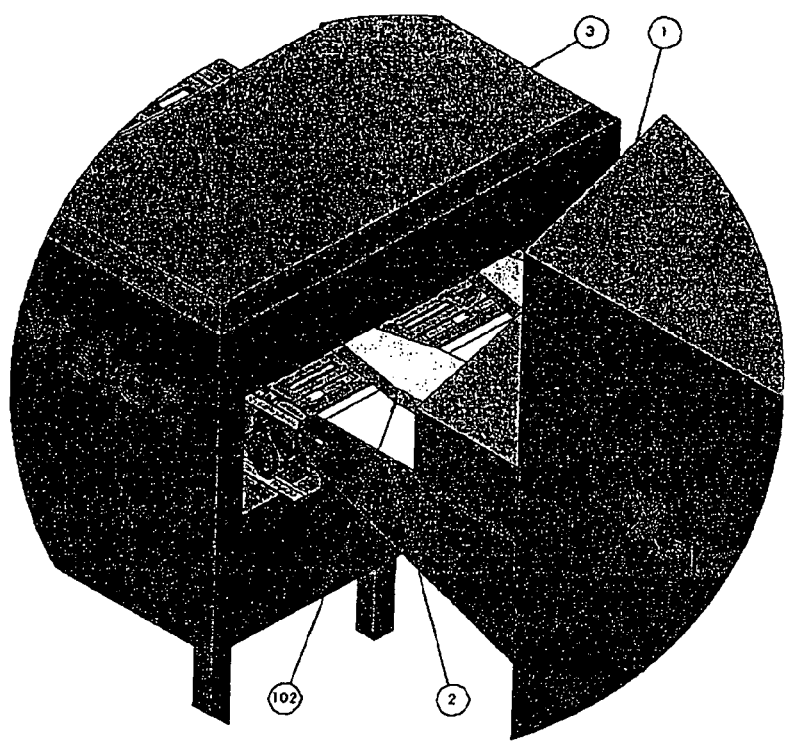
FIG. 4 shows an enlarged view from FIG. 3 showing the transfer from the x-ray conveyor to the cutting conveyor.
Figure 14:
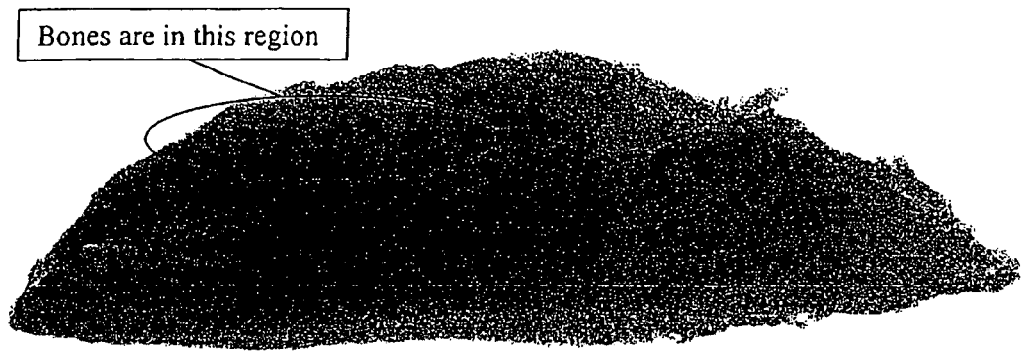
FIG. 14 shows an x-ray image of a red fish fillet showing the pin bones as black lines.

FIG. 3 shows a food processing apparatus 1000 according to the present invention for detecting and cutting tough tissues from food item pieces. In this embodiment, the food processing apparatus is adapted to cut pin bones fully automatically from pre-rigor salmon fillets or white fish (e.g. cod, haddock, saith and redfish) fillets accurately and effectively. The fillets would commonly be trimmed before entering the system on a so-called pre-trimming line. On the pre-trimming line (not shown on drawing) loose bones and obvious flesh defects would typically be manually removed. The fillets can be with or without skin. The fillets 101 are fed one by one onto an x-ray machine 1, which captures an image of the fillet as well as the precise location of the bones in the fillet. An example of such an image is shown in FIG. 14 of a red fish fillet where the bone appear as black lines in the image. The conveyor 2 on the x-ray machine conveys the fillet 101 through the detection means and then off the conveyor onto the cutting conveyor 6. Although the precise location of the fillet 102 was captured when the x-ray image was taken and an accurate encoder in a tracking mechanism is used to track the movement of the fillet, there will always come in some uncertainty about the fillet 102 location when it is transferred over to the cutting conveyor 6 as shown in FIG. 4. For some applications this uncertainty is acceptable and then the vision unit 3 is not needed. In other applications where more accuracy is needed the vision unit 3 is used to capture one or more of the following; silhouette image, full colour image and full 3D scan image.

Figure 11:
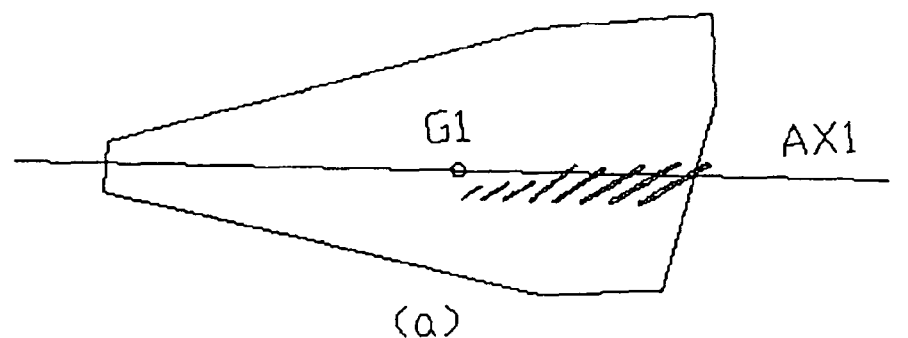
FIG. 11 shows a mapping of an x-ray image and a regular camera image.
Figure 11:
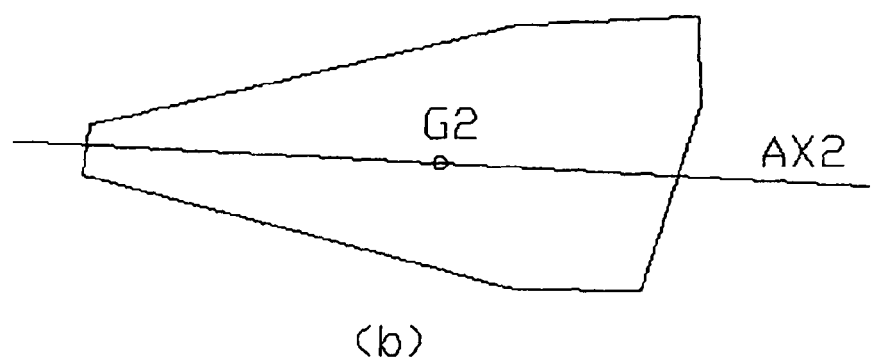
Figure 11:
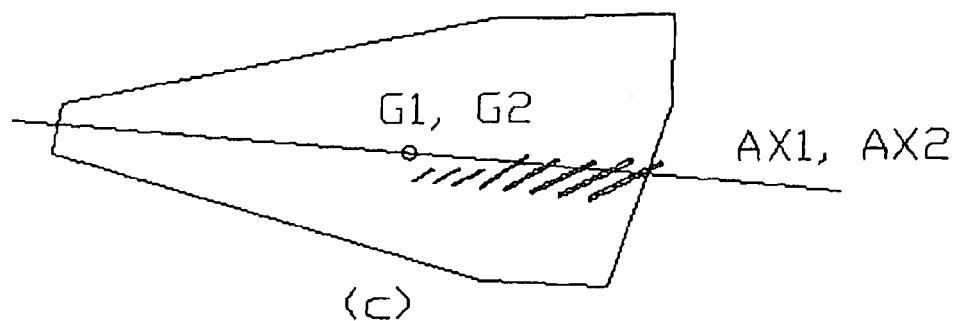
Figure 11:
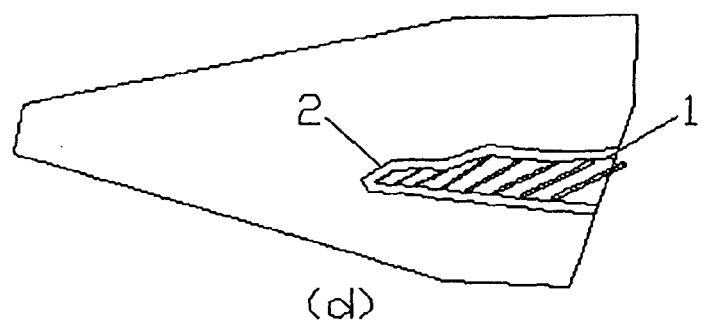

FIG. 11 shows an example of an image of a fillet obtained from the x-ray machine 1 (*a*) and a silhouette image (*b*) of the same fillet obtained with the vision system 3. As the position of the fillet on the cutting conveyor 6 is known precisely when the vision system picture is taken and a good estimate is known about where the fillet is supposed to be according to information from the x-ray machine—utilizing tracking information as well—the system can identify the fillet which these two images are off. As the image taken with the vision unit 3 has a precise location on the cutting conveyor while the x-ray image contains the information about the bones the system must find the optimum location for the x-ray image on top of the vision unit image. In one embodiment, this may be done by matching the centre of gravity of the two images as well as the principal axis. Once that is completed the bones are transferred over to the coordinate system of the vision camera image using a mapping mechanism 1001 comprising a processor (P) 1002, but this may be any type of a computing system e.g. integrated in industrial computer. This mapping is demonstrated on FIG. 11 where the centre of gravity point is marked with G1 for the x-ray image, FIGS. 11 (*a*), and G2 for the vision image, FIG. 11 (*b*). This may as an example be done by detecting the three dimensional shape of the fish fillet using well know imaging apparatus in the art, and based on the mass density of the fish fillet, calculating the centre of gravity point. Similarly the principal axis for each axis are marked with AX1 and AX2, but these axis may be calculating using well known methods in the art based on the detected shape of the fish fillet, or where the food item pieces are chicken breasts, the method disclosed in U.S. Pat. No. 7,452, 266, hereby incorporated in whole by reference, may be applied. Experience shows that image noise has limited effect on the accuracy. Other methods which are for example based on stereo vision algorithms are also an alternative for finding the optimum match. It should be noted that other methods may just as well be applied to compare the position of the food items pieces on the x-ray conveyor and the cutting conveyor and should thus not be construed to be limited to the above mentioned methods.

In one embodiment, when the camera of the vision system 3 takes an image of the food items it knows precisely where the camera frame is located with a respect to a fixed point on the conveyor. The edge of the frame is therefore at a know position and the precise position of the encoder is known at all times and then as well when the image is taken. By calculating the distance from the edge of the image to the position where the image starts the precise encoder position is known where the piece starts. The coordinate frame of the piece is then updated with the encoder position updates and the cutting robot can use traditional tracking method to cut the pieces at the precise locations determined by the cutting pattern.

Figure 12:
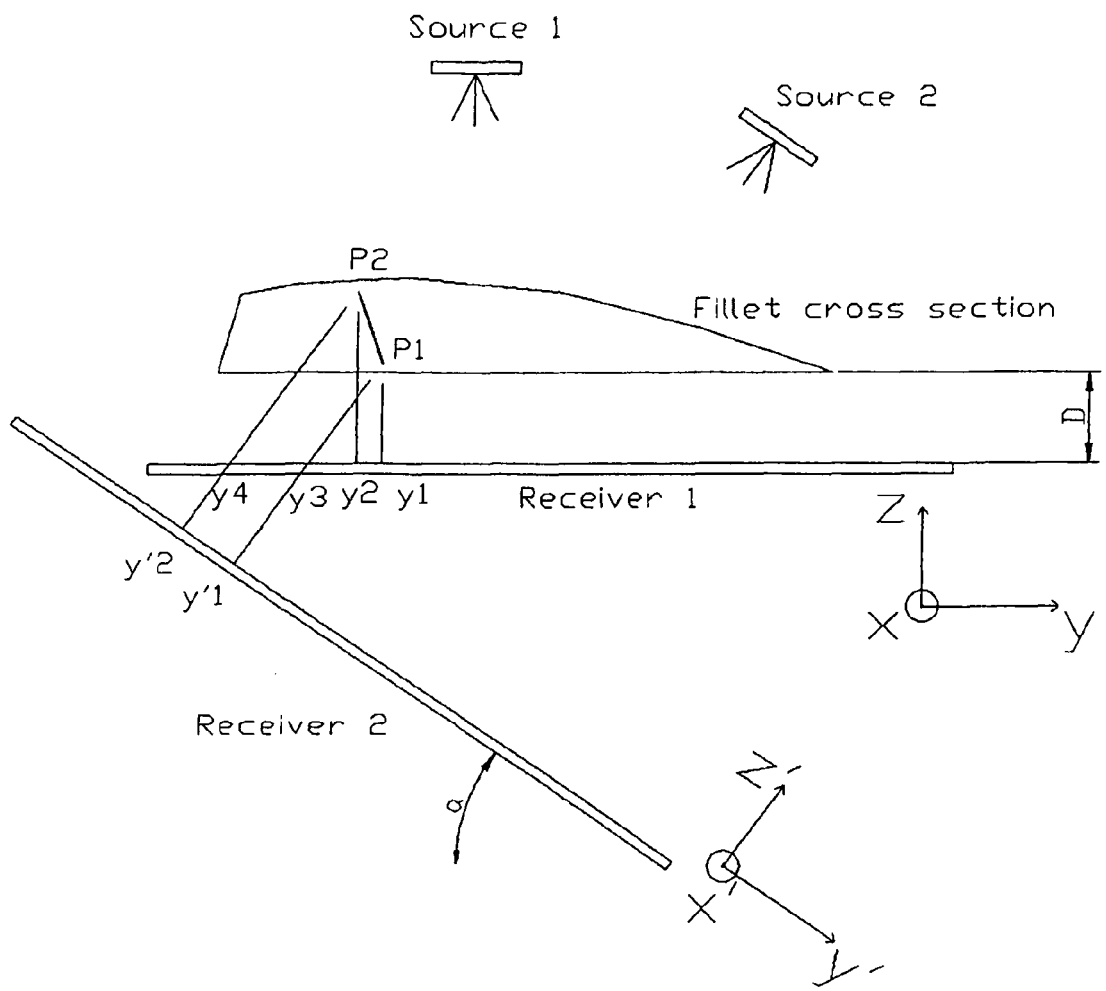
FIG. 12 shows an embodiment of multiple source and detectors x-ray system.

In FIG. 12 is marked the coordinate system of the x-ray machine 1 which consists of a x-axis along the moving direction of the conveyor (pointing outside of the drawing plane), a y-axis perpendicular to the moving direction of the conveyor and finally z-axis which is a normal to the conveyor belt it self. With a single source x-ray machine, as was utilized to take the image in FIG. 14, the location of the bones will only be known in the xy-plane and no information is available from the image about the z-coordinate of the bones. For the purpose of demonstrating the calculation of the bone location a bone is drawn into the cross section of a fillet and it is assumed that the bone is linear and has endpoints P1 and P2. The objective is to find the coordinates of these two points. The first image gives the y-coordinates of the points, that is y1 and y2. The x-coordinates are then determined by the time the bone is detected for a linear scan system but from the image if self when a frame image is used. If the bones are to be cut away from the loin part of the fillet with maximum certainty a straight cut would be used and the location would be outside the bounding box of the pin bones. This would result in reduced cutting yield as is shown on FIG. 9 and indicated with two areas labeled A1 and A2. One way to improve the cutting yield is to use priory knowledge about the angle, which is to be expected for fillets of a given type and size and cut the fillets in that angle.

Figure 13:
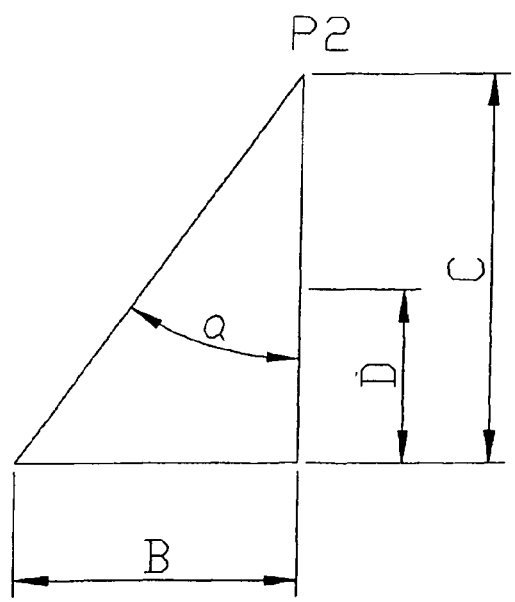
FIG. 13 shows a triangle for demonstration of calculations of z-coordinates of bones.

Another more reliable method is to utilize multiple x-ray sources and detection modules. For most applications, one additional x-ray source and detection module would be required although more will always generate more accuracy. An example of such a setup where the second source and receiver is placed at an angle to the first receiver is also shown in FIG. 12. The second receiver has its own coordinate system, which is obtained by rotating the xyz-coordinate system by degrees around the x-axis. The new coordinate system is referred to as x'y'z' —coordinate system. The second x-ray system would typically be offset from the first system in the x-direction as much as would be needed for fitting mechanically the receivers. An x-ray image taken with this system will identify a new location of the bones and are those marked y'1 and y'2 on the image. These coordinates can then easily be mapped into corresponding coordinates in the xyz-coordinate system and the mapped y-coordinates of the two points P1 and P2 are labeled y3 and y4 in FIG. 12 respectively. In the triangle shown in FIG. 13 demonstrates a simple triangle, which aides in demonstrating how the z-coordinates are calculated for linear bones based on the extra information gained from the second receiver. The z-coordinate of the point P2 is calculated based on the variables shown in FIG. 12 as follows:

$$z2 = C - D = B/\tan(a) - D = (y4 - y2)/\tan(a) - D$$

Similarly the z-coordinate for the point P1 is calculated as follows:

$$z1 = (y3 - y1)/\tan(a) - D$$

Figure 9:
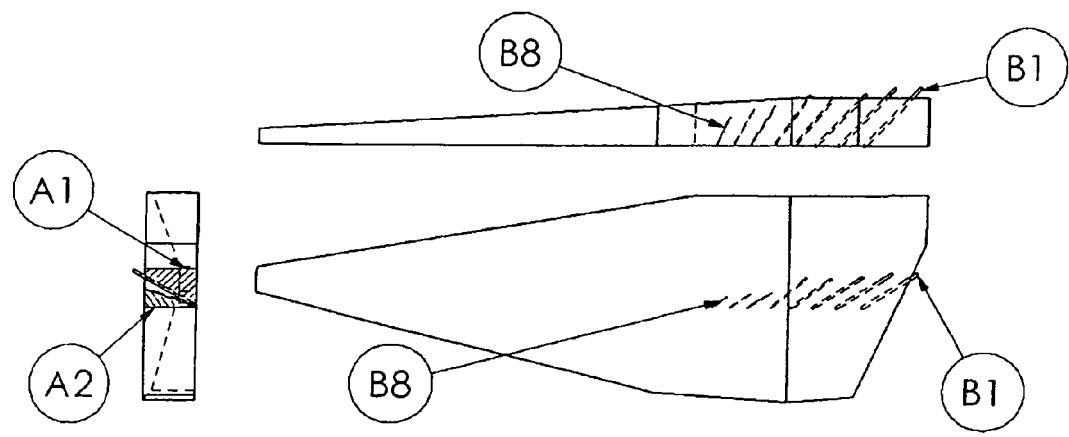
FIG. 9 shows possible location of pin bones in a fish fillet for example a salmon or white fish fillet.

Once the precise endpoints of each bone in the fillet are known the cutting system can be used to cut the bones out of the fillet at each x-location in the fillet at the correct angle to improve the cutting yield such that section A1 and A2 shown in FIG. 9 will remain with the bone free sections of the fillet.

For nonlinear bones which are commonly found in fish fillets the bones can be broken up to any number of linear sections and the same method will then be used to calculate the endpoints and any number of internal points in each bone. It is however clear that the more accuracy is needed and the more curved the bones are the more need is for more than two sources and receivers. More sources and receivers can also assist in distinguishing between multiple bones, which can be detected as a single bone from certain angles.

Figure 10:
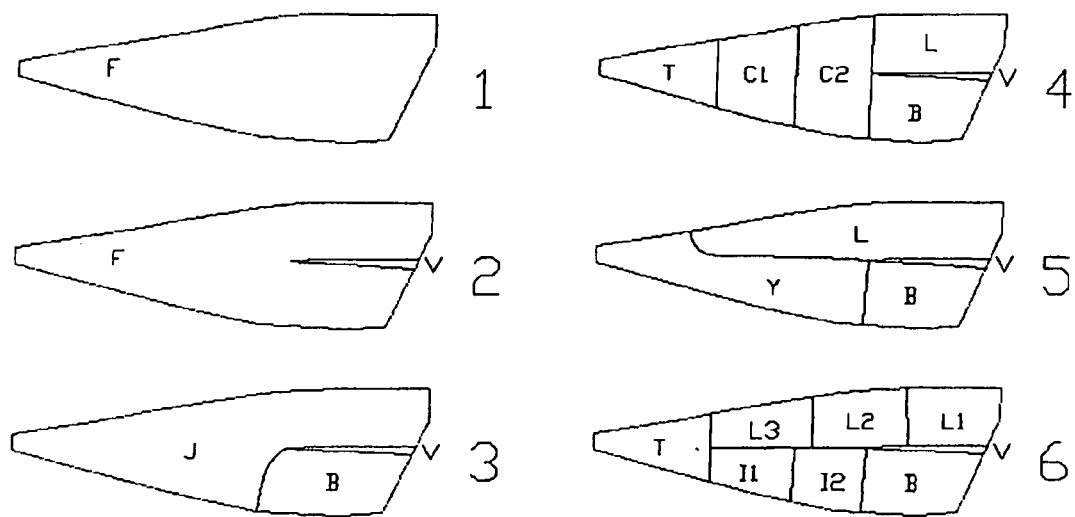
FIG. 10 shows possible cutting patterns for white fish or salmon fillets.

Once the fillet 102 has passed the vision sensor and the images from the x-ray machine and the bones from the x-ray image have been located on the vision image, the next step is to determine the cutting pattern of the fillet. The cutting pattern can be any desired pattern and can involve cutting out of sections of the fillet, which contain bones. Some common cutting patterns used in the fishing industry are shown in FIG. 10. Although the bones will typically be cut away from the rest of the fillet with the minimum amount of tissue attached to it there are also application where only a single cutting device is used and the system would only make the most important cut between the loin and the pin bones. The cutting pattern can also be determined based on the weight of the fillet, which can be obtained a priory or estimated based on a 2D or 3D image of the object. The system can thus cut the fillet into portions of fixed weight, length or in a pattern, which optimizes the portion yield. Once the pattern has been determined it is superimposed onto the image of the fillet and that information is then sent to the robotic controller, which performs the cuts. The cutting pattern is defined in terms of a moving coordinate frame of the fillet 105 and the robotic controller and the vision system have access to the same encoder of the cutting conveyor 6 to update the location of that coordinate frame.

Figure 16:
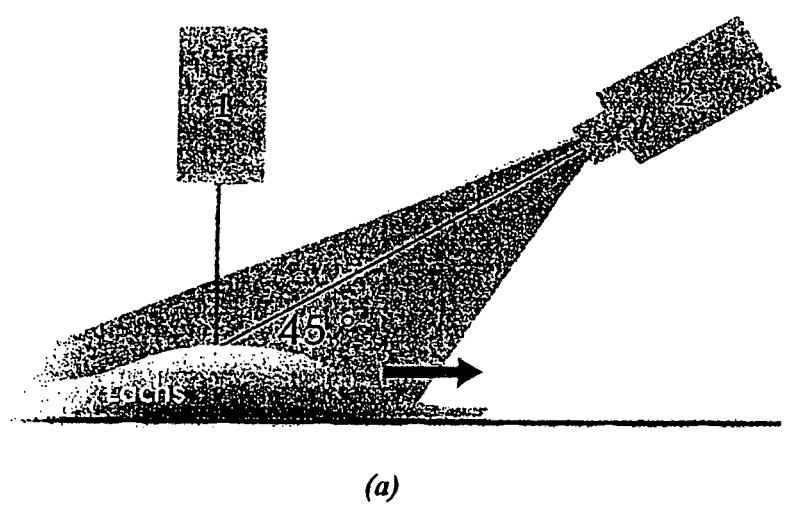
FIG. 16 illustrates graphically an embodiment of an imaging system for capturing 3D image data of said food item pieces, and FIG. 17 demonstrates graphically cross sections for the mapping instead of using a complete volumetric mapping.
Figure 16:
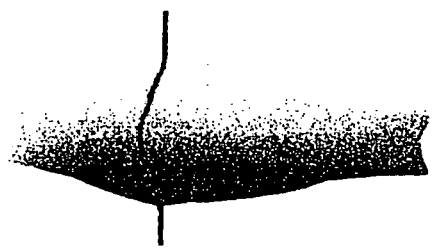

A selection of other types of mapping can be used when a 3D scanning is used in the second image camera. An embodiment of an image system to capture 3D image of a moving object indicated by the arrow is shown showing a laser light (1) positioned directly above the object where the emitted light beam lights up a single line on the object. A camera (2) is then placed under an angle. The frame camera takes then images at high frequency to capture the laser light where the shift of the laser light as depicted in FIG. 16b is used to determine the height of the object at that cross section of the object. By adding these images together a complete digital 3D image of the object is obtained. It typically assumes that the object is completely flat at the bottom but additional lasers and cameras can be used to obtain a more accurate model of the objects (not shown here).

An x-ray image can also be used to generate a 3D image of the object. This is based on the fact that the intensity of each pixel in the image is based on the thickness of the object at that location. The thicker the object is the more it reduces the intensity. It is though important to eliminate the bones—or other tough tissues—from the image by putting the intensity where the bones are with an averaging method where the intensity where the bones, or any other tough tissue, was will be the average of the neighbouring pixels.

From the 3D image of the object an accurate measurement of the complete volume of the object is obtained. The intensity obtained in the x-ray image can then be converted to estimate of the height at each location where less intensity means more height.

A pure volumetric mapping can then be obtained by initially adjusting the height at each pixel in x-ray image proportionally such that the total volume measured with the x-ray image matches precisely the volume measured with the 3D system. The x-ray image, volume of which is called X, is then mapped onto the 3D image, volume of which is called Y, such that the volumetric error is minimized. The volumetric error is defined as:

$$X + Y - X \cap Y$$

That is the sum of the two volumes minus the common set of the two volumes, is minimized. Another way to formulate this is to minimize the sum of the volume of the x-ray image which is not inside the 3D image plus the volume of the 3D image which is not inside the x-ray image.

Figure 17:
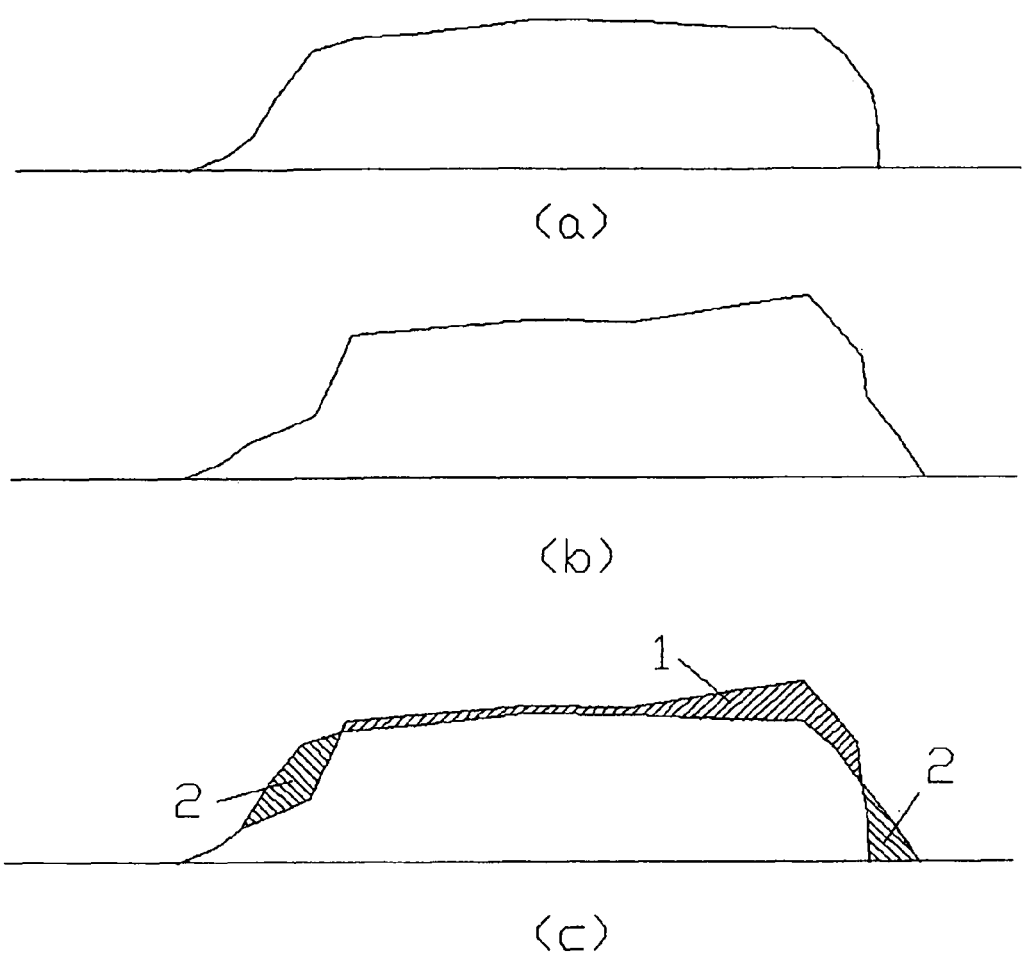

This mapping is demonstrated for a cross section of an object in FIG. 17. FIG. 17 (a) shows a cross section of an x-ray image and in (b) is shown a cross section from a 3D image. In (c) the x-ray image has been mapped onto the 3D image such that the 2D volumetric error is minimized. The area which is in the 3D image and not in the x-ray image is marked with 1 while the area which is in the x-ray image and not in the 3D image is market with 2 in FIG. 17 (d).

Instead of using a complete volumetric mapping it is an option to utilize the cross sections for the mapping as is demonstrated in FIG. 17. Then each cross section of the object is mapped such that the error is minimized and then based on this mapping the entire object is located such that the deviation from optimal location of each cross section is minimized.

Instead of using the volumetric mapping for the entire object it is an alternative to map just the regions around the touch tissues where maximum accuracy is needed. Then both images are cut at a certain location and the section which does not include the tough tissues is removed before the mapping is done. The 2D mapping methods and the mapping based on cross sections can also be used only in areas of interest rather than for the entire object.

All the mapping discussed here above can be used in any desired combination. It might thus be desired to map the images first based on 2D methods with the centre of mass and principal axis and then use the 3D mappings to relocate the object such that minimum 3D error is obtained around the bones.

The purpose of mapping of the x-ray image onto the second image is to have the location of the tough tissues in the image which can be accurately tracked on the cutting conveyor. Once that has been determined the cutting pattern for the object can be determined.

Commonly it is desired to cut the tough tissues out of the primary part of the object. This is demonstrated in FIG. 11 (d) where two paths are created based on position information of the tough tissues in the second image. The first path is marked as 1 and is placed right at the boundary of the tough tissue. The second path is marked as 2 and is obtained by offsetting the first path a given amount which is based on the inaccuracy in the system. The offset will ensure that the primary piece is not with any tough tissues. Once the cutting path has been planned the cutting path is transferred over to the coordinate system of the robot which will then track the path as the piece moves on the conveyor and then accurately make the cut on the object according to the desired curve.

When dual x-ray sensing method is used as indicated in FIG. 12 the system has not only the 2D location of the bones, which could be any other tough tissues, but the full 3D position of the bones will be obtained. Then the path is not purely determined by the 2D silhouette image of the bones as illustrated in FIG. 11 (d) but a 3D path will be planned based on the 3D location of the bones. The path will also be planned based on what type of robot will be used for controlling the cutting nozzle. The more degrees of freedom the robot has the more possibility it has to cut as close to the bones as possible what ever the position of the bones are.

Figure 18:
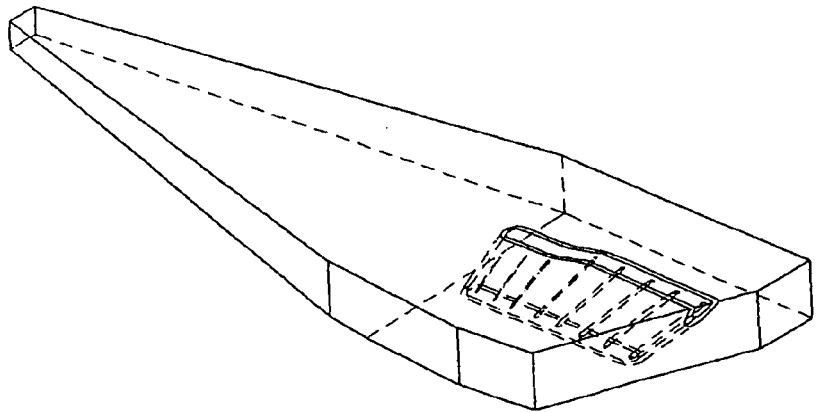
FIG. 18 depicts a cutting path that is to fit ruled surface at either side of the bones.

One method to plan the path is to fit ruled surface at either side of the bones as illustrated in FIG. 18. When the cutting path is planned then this surface can be offset by a user controlled amount which will typically depend on the accuracy in the cutting system.

Figure 5:
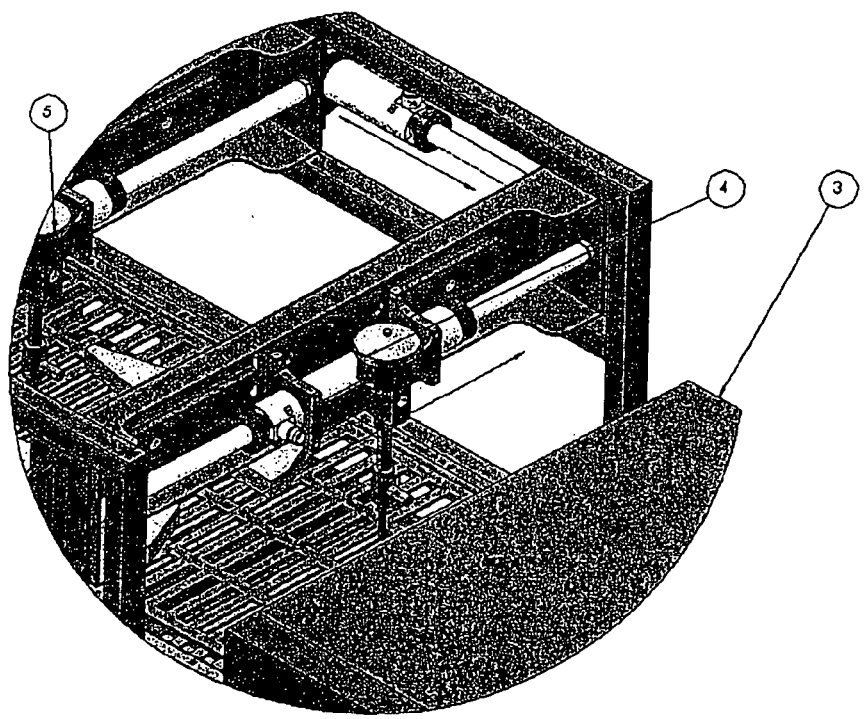
FIG. 5 shows an enlarged view from FIG. 3 showing the first robotic cutter which has a single degree of freedom.

In one embodiment, the first robotic cutting unit 4 consists of a linear motor—which can only move perpendicular to the moving direction of the cutting conveyor 6 as shown with the arrows on FIG. 5—a valve to disable and enable the flow of the water, and a nozzle with very fine aperture, for example 0.07-0.25 mm. The nozzle assembly is attached rigidly to the linear motor and then there is a water pipe leading to the valve from a high pressure water pump. The pump and the water pipe are not shown on the Figure. By opening for the water stream the system will begin to cut whatever is underneath the nozzle. As the conveyor is moving in the x-direction while the linear motor moves in the y-direction any portion of the fillet can be cut. The limitations are however that only a single path through the fillet can be traced and cut through the fillet. Tilted cuts or cuts perfectly perpendicular to the moving direction of the cutting conveyor are not possible. This simple setup can be suitable for very thin fish like red fish where tilting of the cut is not critical and also for trimming of the sides of the fillet. Such trimming is practical in the salmon industry where fat is commonly cut off from the sides of fillets.

Figure 6:
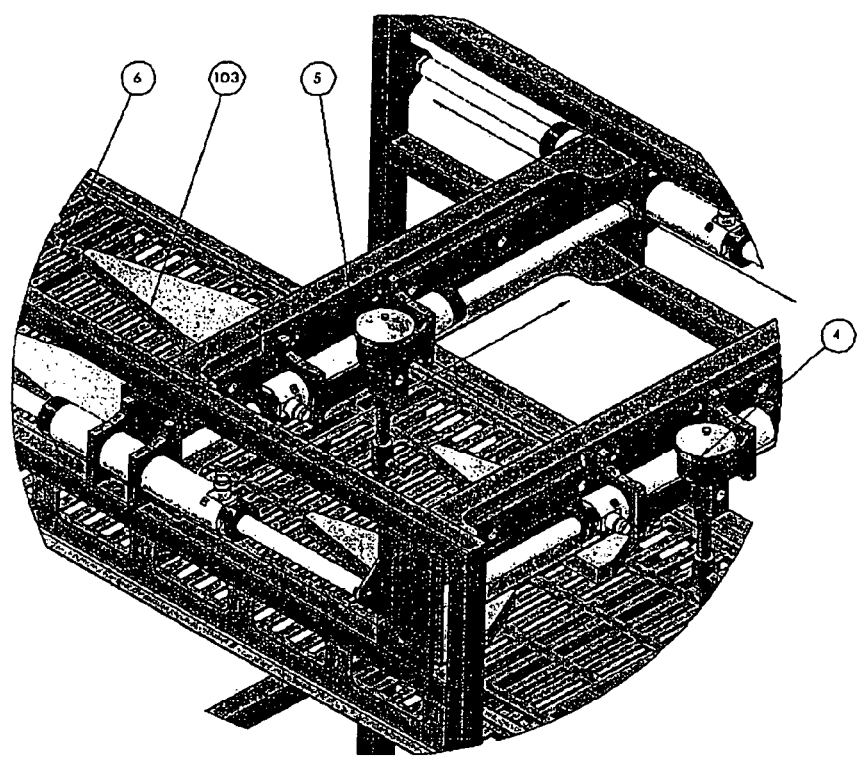
FIG. 6 shows an enlarged view from FIG. 3 showing the second robotic cutter which has two degrees of freedom.
Figure 7:
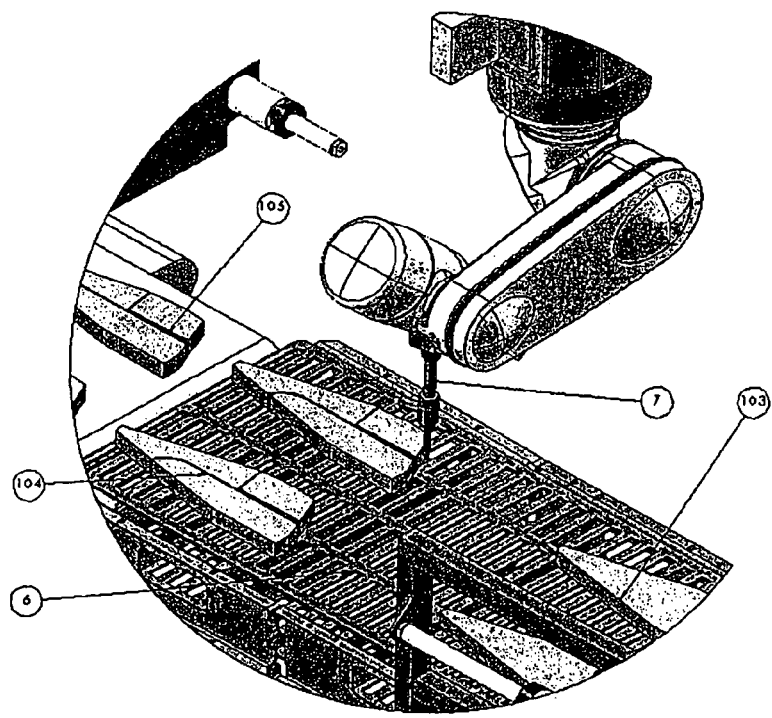
FIG. 7 shows an enlarged from FIG. 3 showing the third robotic cutter which has six degrees of freedom.

The second robotic cutting unit 5 comprises of three linear motors, where two of the linear motors work together to move a steel bracket along the moving direction of the cutting conveyor as shown in greater detail in FIG. 6. Attached to the bracket is then a linear motor, which can move perpendicular to the moving direction. A nozzle assembly is attached to this linear motor in a similar way as to the first robotic cutting unit. This cutting unit can cut straight cuts perpendicular to the moving direction of the conveyor as the cutting nozzle can be transported at the same speed as the conveyor while the nozzle is moved across the fillet.

The third robotic cutting unit 7 comprises of a six-axis robot. A nozzle assembly is attached to the robot in a similar way as on the previous robots. This robot has flexibility to make any type of cut with any tilt angle. It should be noted that in this embodiment, said first, second and third cutting units work together in and independent way and can thus perform the cutting different time periods.

The robotic control computer splits up the cutting paths between the robots such that each robot cuts only the desired part of the desired cutting pattern. After the fillet 104 has passed the final robot the cutting of the fillet is completed.

Figure 15:
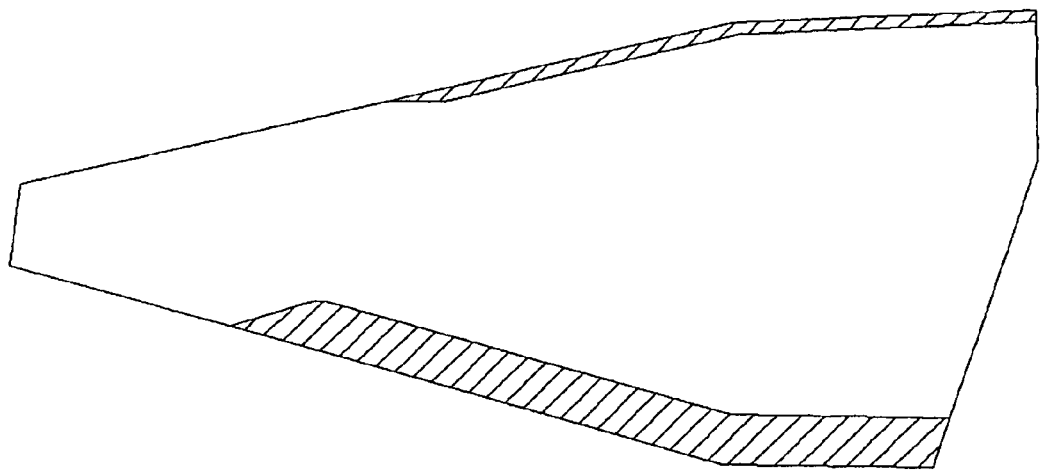
FIG. 15 shows an image indicating fat stripes on fish fillets.

This embodiment can also be used to cut away fat stripes from the fillet. Typically two robotic cutting units, each with a single degree of freedom, will be used for such cuts. Both an x-ray image and a colour image of the fillet can assist in determine the optimum cutting locations for such cuts. An example of a location of such cuts is shown in FIG. 15.

Figure 8:
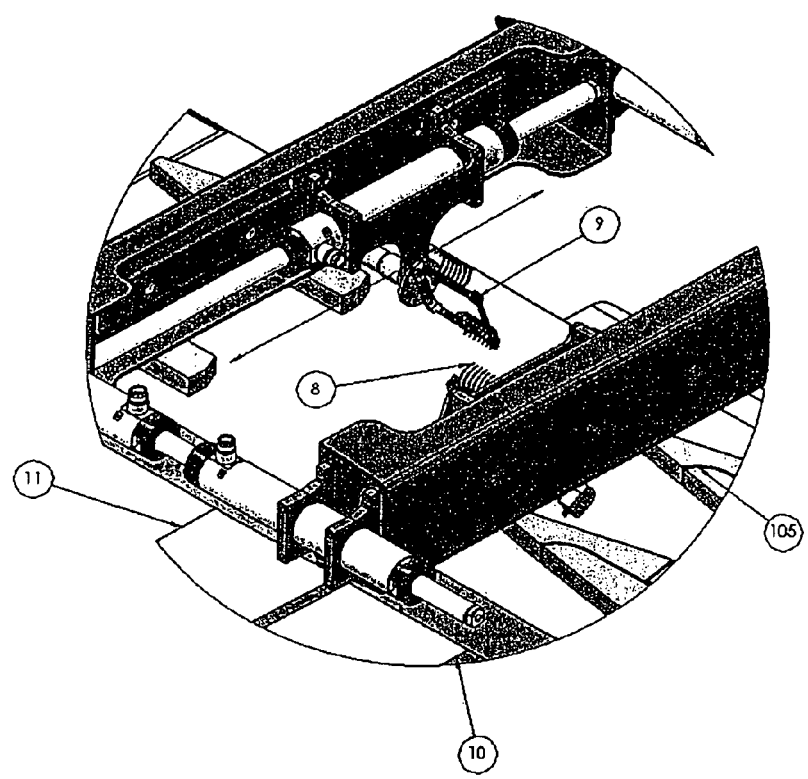
FIG. 8 shows an enlarged view from FIG. 3 showing a robotic gripper for removing items from the cutting conveyor.

A robotic gripper units 8, 9 are then used to take away pieces which contain bones inside. It can also be used to remove fat stripes cut from the fillet. The gripper is shown in greater detail on FIG. 8. The bone free sections of the fillets 108 continue onto another x-ray machine 13 while the bone sections are transferred over to conveyors 10, 11 for further processing or packing. The second x-ray machine 13 works identically to the first x-ray machine and takes an x-ray image of the fillets 108. Those images are used for two purposes. Firstly they are used to control a pull-back conveyor 14 which direct the fillet portions 110 which still contain bones onto conveyor 16 while the remaining portions 111 which are bone free go onto conveyor 18. Typically the bones from the portions with remaining bones will be manually removed and then fed again through the x-ray machine 13. The second purpose is to provide feedback to the cutting computer about the performance of the cutting. This feed back is especially important when the system has a tendency to leave bones in portions which are supposed to be bone free but it can also assist in optimizing the yield. Further optimization of the yield can be obtained by inspecting portions which contain bones in the second bone detection system as the extra tissue on those portions can then be evaluated.

The fish portions are finally inspected and packed fresh or utilized in further processing like freezing or breading.

Although an x-ray image is primarily used for bone detections it has shown to be very useful for other type of measurements of animal tissues or food products. This includes measurement of defects and hair length in furs and fat contents in various food products. When trimming salmon fillets it is very common to trim of fat stripes, which are commonly on the belly side of the fillets and to lesser amount on the loin side. The current invention can as well be used for such trimming applications where either the bone detection means or the vision image or a combination of both will be used to obtain information such that a desired fat trim can be made. An example of location of such trims in a salmon fillet is shown in FIG. 15. This cutting pattern would typically be a pure addition to other cutting patterns where bones are cut from the fillet or it is cut into portions. This extra cut will typically require two extra cutting nozzles which would be placed on a robot with a single degree of freedom (4) as shown in FIG. 5.

Applications in the meat industry include cutting of ribs where the cutting can be positioned such that the ribs are not cut although the system can cut through other bones in the meat sections.

Applications in the poultry industry include fully automatic detection and cutting of cartilage in the front tip of chicken breasts which commonly remain attached to the breasts after filleting. While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A food processing apparatus adapted for detecting and cutting tough tissues such as bones, cartilage, and fat from food item pieces such as fish or meat fillets or poultry items, comprising:
    a first solid conveyor belt for X-ray imaging, having an in-feed end and an out-feet end,
    at least one x-ray machine associated to said first solid conveyor belt for imaging incoming food items conveyed on the first solid conveyor belt and based on the imaging generating x-ray image data indicating the location of the tough tissues in said food item pieces, wherein the x-ray machine comprises two or more x-ray sources placed at different viewing angles with respect to the incoming food objects adapted to emit x-ray beams onto the incoming food objects under said different viewing angles and thus generate at least two x-ray measuring data,
    a processor for generating said first image data by processing the at least two x-ray measuring data for generating three dimensional (3D) x-ray image data of said tough tissues,
    a second porous conveyor belt for water jet cutting, which in-feed end is adapted to be placed adjacent to the out-feed end of said first solid conveyor belt for receiving said food items pieces from the out-feed end of the first solid conveyor belt,
    a vision system for supplying second image data of said food item pieces subsequent to the imaging by said at least one x-ray machine, the second image data including position related data indicating the position of the food item pieces on said second porous conveyor belt prior to said cutting, said second porous conveyor belt being adapted to convey the food item pieces during said imaging and while cutting said tough tissues from said food item pieces, and
    a tracking mechanism for tracking the position of the food item pieces at all times, and
    a mapping mechanism comprising:
    a processor for utilizing the tracking position data for the food items subsequent to said x-ray imaging data so as to determine an estimated position of the food item pieces on said second porous conveyor belt where subsequent to obtaining the second image data, comparing said estimated coordinate position of the food item pieces to the actual position on the second porous conveyor belt based said second image data, where in case of non-match between said estimated coordinate position and said actual position, wherein the processor maps the x-ray image data onto the second image data such that the position of the tough tissues matches to said second image data, the processor comparing the estimated position of the food item pieces on said second porous conveyor belt to the actual position on the second porous conveyor belt based on said second image data comprising determining whether the total volume of the 3D x-ray image data matches with the volume of the 3D image data, where in case of non-match, mapping by said processor the volume of the 3D x-ray image data onto the volume of the 3D image data such that the volumetric error is minimized, and
    a control unit operable to operate a cutting means for cutting said food items pieces by utilizing said mapped x-ray image data as operation data.

2. The food processing apparatus according to claim 1, wherein the processor is programed to compare the estimated position of the food item pieces on said second porous conveyor belt to the actual position based on said second image data by:
    comparing whether the center of gravity for the x-ray imaging data matches with the center of gravity of the second image data, where in case on non-match, mapping the x-ray imaging data onto the second image data such that the center of gravity of the x-ray imaging data matches with the center of gravity of the second image data, or
    comparing whether the principle axis for the x-ray imaging data matches with the principle axis of the second image data, where in case on non-match, mapping the x-ray imaging data by means of rotating the x-ray imaging data until the principle axis for the x-ray image and the second image data are coincident, or
    comparing whether the scaling of the x-ray imaging data matches with the scaling of the second image data by means of comparing the area of the x-ray imaging data matches with the second image data, where in case of non-match, mapping the x-ray imaging data by means of adjusting the scaling of the x-ray imaging data until the area of x-ray imaging data matches with the area of the second image data,
    a combination of one or more of the above.

3. The food processing apparatus according to claim 1, wherein said vision system is selected from:
- a digital camera, said second image data including being a 2D silhouette image data of said food items,
- a digital camera and a laser based vision system, said image data being full 3D image data of said food items,
- a colour digital camera and a laser based vision system, said image data being full colour 3D image data of said food items.

4. The food processing apparatus according to claim 3, wherein said the dimensional (3D) image data obtained from said digital camera and a laser based vision are used for estimating:
- the volume of the food items,
- the weight of the food items,
- the thickness profile of the food items,
- the colour or the colour profile of the food items so as to estimating or detecting fat or defects such as blood spots or gaping, on the food items, or
- any combination thereof.

5. The food processing apparatus according to claim 1, wherein said volumetric error is minimized by means of minimizing of the volumetric error being determined by said processor by means of minimizing the sum X+Y of the two volumes minus the common set X∩Y of the two volumes, where X is the volume determined by said two or more x-ray sources and Y being the volume determined by said 3D vision system.

6. The food processing apparatus according to claim 1, wherein the estimated position of the food item pieces on said second porous conveyor belt to the actual position on the second porous conveyor belt based on said second image data comprising comparing whether the cross sectional surfaces of said 3D x-ray image data matches with the cross sectional surfaces of said 3D image data, where in case of non-match, mapping the said 3D x-ray image data onto the 3D image data such that the difference between the area of the cross sectional surfaces between the 3D x-ray image data and the 3D image data is minimized.

7. The food processing apparatus according to claim 1, wherein the cutting means is a high pressure water jet nozzle system or a cutting blade having one to six degrees of freedom movement.

8. The food processing apparatus according to claim 1, wherein said three dimensional x-ray image data are processed for determining an angle of the tough tissues in the food items, the angle of the tough tissues being used for determining a cutting angle which is used as a tuning parameter for adjusting the angle of the high pressure water jet nozzle system or the cutting blade when cutting the tough tissues from the food items.

9. The food processing apparatus according to claim 1, further comprising a second tough tissue detection means for generating third image data by imaging the processed food items after removing the cut portions there from.

10. The food processing apparatus according to claim 9, wherein the second tough tissue detection means is an x-ray machine or a vision system and where the third image data is the resulting image data from the x-ray machine or a vision system, the third image subsequently being processed by said control unit and used as a tuning parameter for tuning the operation of the cutting means.

11. The food processing apparatus according to claim 1, wherein the food items are selected from fish fillet where the tough tissues are the bones in the fish filet, meat where the tough tissues is cartilage, bones or fat or combination thereof, poultry meat where the tough tissues is cartilage, bones or fat or combination thereof.

12. A method of detecting and cutting tough tissues such as bones, cartilage, and fat from food item pieces such as fish or meat fillets or poultry items, comprising:
- imaging incoming food item pieces using at least one x-ray machine to image incoming food items conveyed on a first solid conveyor belt and based on the imaging generating x-ray image data indicating the location of the tough tissues in said food item pieces, wherein the x-ray machine comprises two or more x-ray sources placed at different viewing angles with respect to the incoming food objects adapted to emit x-ray beams onto the incoming food objects under said different viewing angles and thus generate at least two x-ray measuring data,
- while conveying the food item pieces on a first solid conveyor belt and based on the imaging generating x-ray image data indicating the location of the tough tissues in said food item pieces,
- conveying, subsequent to said x-ray imaging, said food item pieces on a second porous conveyor belt,
- where during the conveying,
- supplying second image data of said food item pieces subsequent to the imaging by said at least one x-ray machine,
- cutting said tough tissues from said food item pieces subsequent to supplying the second image date, the second image data including position related data indicating the position of the food item pieces on said second porous conveyor belt, and
- tracking the position of the food item pieces at all times,
- utilizing the tracking position data for the food items subsequent to said x-ray imaging data so as to determine an estimated position of the food item pieces on said second porous conveyor belt, where subsequent to obtaining the second image data, comparing said estimated coordinate position of the food item pieces to the actual position on the second porous conveyor belt based said second image data, comprising determining whether the total volume of the 3D x-ray image data matches with the volume of the 3D image data, where in case of non-match, mapping by said processor the volume of the 3D x-ray image data onto the volume of the 3D image data such that the volumetric error is minimized,
- mapping the x-ray image data onto the second image data such that the position of the tough tissues matches to said second image data, and
- cutting said food items pieces by utilizing said mapped x-ray image data as operation data.

13. A computer program comprising instructions for carrying out all the steps of the method claim 12, when said computer program is executed on a computer system.

14. The food processing apparatus according to claim 5, wherein the estimated position of the food item pieces on said second porous conveyor belt to the actual position on the second porous conveyor belt based on said second image data comprising comparing whether the cross sectional surfaces of said 3D x-ray image data matches with the cross sectional surfaces of said 3D image data, where in case of non-match, mapping the said 3D x-ray image data onto the 3D image data such that the difference between the area of the cross sectional surfaces between the 3D x-ray image data and the 3D image data is minimized.

* * * * *

UNITED STATES PATENT AND TRADEMARK OFFICE
CERTIFICATE OF CORRECTION

| | | |
|---|---|---|
| PATENT NO. | : 9,095,147 B2 | Page 1 of 1 |
| APPLICATION NO. | : 13/577316 | |
| DATED | : August 4, 2015 | |
| INVENTOR(S) | : Helgi Hjalmarsson et al. | |

It is certified that error appears in the above-identified patent and that said Letters Patent is hereby corrected as shown below:

In the claims

Column 16, Line 43, Claim 2:

After "the processor is"
Delete "programed" and
Insert -- programmed --.

Column 16, Line 49, Claim 2:

After "where in case"
Delete "on" and
Insert -- of --.

Column 16, Line 55, Claim 2:

After "where in case"
Delete "on" and
Insert -- of --.

Signed and Sealed this
Twenty-ninth Day of December, 2015

Michelle K. Lee
*Director of the United States Patent and Trademark Office*